June 3, 1924.  
H. P. MACDONALD  
SHAFTING AND JOINT THEREFOR  
Filed Jan. 12, 1920  
1,496,319  
2 Sheets-Sheet 1

WITNESS
Gustav Genzlinger.

INVENTOR.
Harry P. Macdonald,
by Synnestvedt & Lechner
Attys.

June 3, 1924.

H. P. MACDONALD

SHAFTING AND JOINT THEREFOR

Filed Jan. 12, 1920 2 Sheets-Sheet 2

WITNESS
Gustav Genzlinger.

INVENTOR.
Harry P. Macdonald
by Synnestvedt & Lechner
Attys

Patented June 3, 1924.

1,496,319

UNITED STATES PATENT OFFICE.

HARRY P. MACDONALD, OF MONTCLAIR, NEW JERSEY, ASSIGNOR TO THE SNEAD & CO. IRON WORKS, A CORPORATION OF NEW JERSEY.

SHAFTING AND JOINT THEREFOR.

Application filed January 12, 1920. Serial No. 350,896.

*To all whom it may concern:*

Be it known that I, HARRY P. MACDONALD, a citizen of the United States, residing at Montclair, in the county of Essex and State of New Jersey, have invented certain new and useful Improvements in Shafting and Joints Therefor, of which the following is a specification.

This invention relates to shafting and shaft connections such as are used in jointed automotive propeller or driving shafting, of which an automobile driving assembly is an example. It is particularly useful in long drives having three joints and provided with a bearing adjacent one of the joints.

For such drives it has been heretofore customary to use solid shafts or tubular shafts having a solid end welded thereto, but both types are open to objection.

One of the primary objects of my invention is the provision of improvements whereby a tubular shaft of maximum diameter and therefore strength, may be employed, while at the same time adequate provision may be made for connection with the spider and for a seat for the bearing without weakening the shaft.

Another object of the invention resides in the provision of improved means whereby a connection for the joints between shafts is provided which combines simplicity with great strength.

The foregoing, together with such other objects as may hereinafter appear, I obtain by means of a construction, the preferred embodiments of which I have illustrated in the accompanying drawings, wherein—

Figure 1:
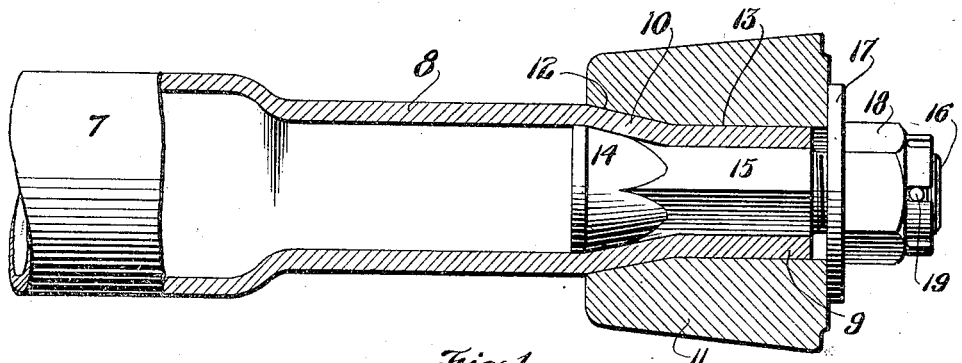
Figure 2:
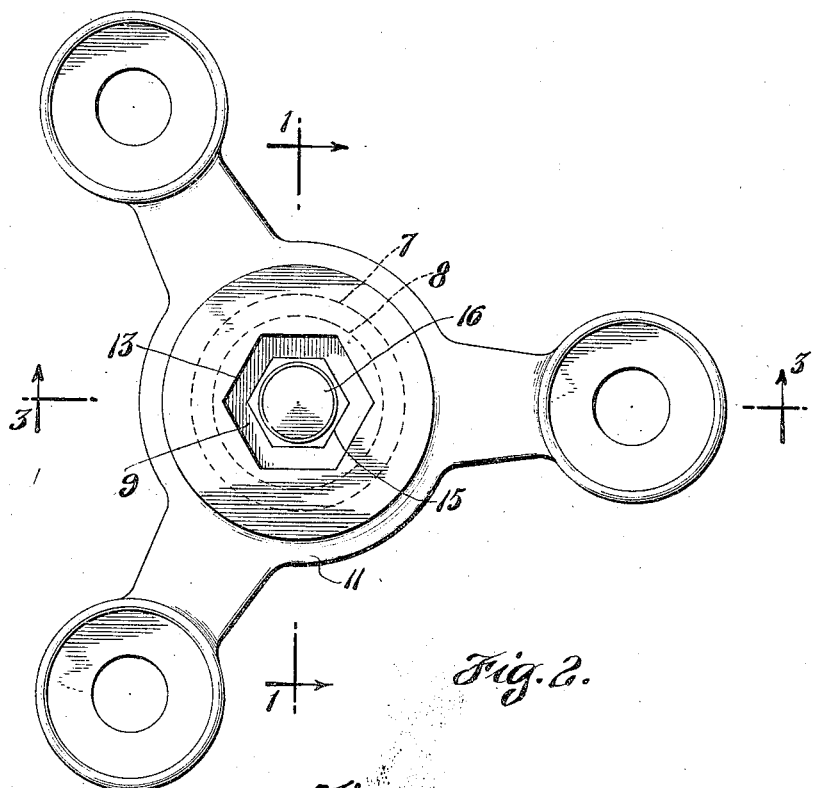
Figure 6:
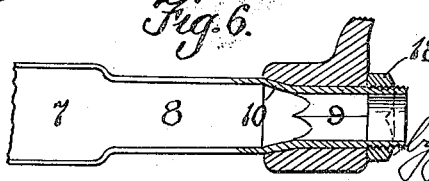
Figure 3:
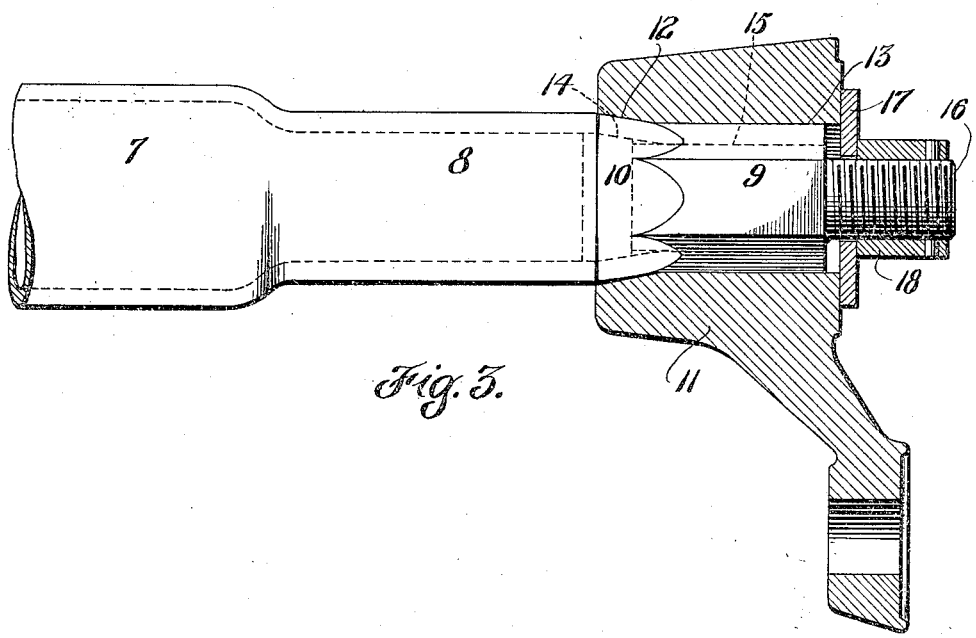
Figure 4:
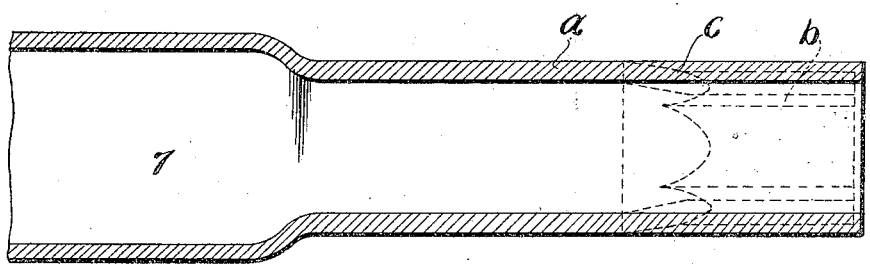
Figure 5:
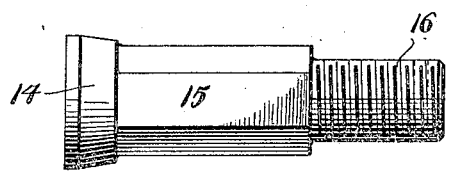

Figure 1 is a longitudinal section through the joint end of a shaft embodying my improvements taken on the line 1—1 of Figure 2; Figure 2 is an end elevation of Figure 1 with certain of the parts removed; Figure 3 is a section taken on the line 3—3 of Figure 2; Figure 4 is a section taken through the shafting illustrating certain steps in the manufacture; Figure 5 is a side elevation of a modification of a detail of my invention; and Figure 6 is a section illustrating still another modification of the invention.

In carrying out my invention I take a tubular shaft 7, of large diameter and swage down the joint end or ends thereof so as to provide a cylindrical portion $a$ (see Figure 4) and to thicken the wall of the shaft and allow for machining it to accommodate the inner race or ring of the ball bearing, which is ordinarily found necessary in long assemblies of this character. I then further swage down the extremity of the shaft as indicated at $b$ in dotted lines in Figure 4, such portion being also cylindrical, with a greater thickness of wall as a result of the swaging, the portions $a$ and $b$ being connected by a truncated cone portion $c$. The shaft is then put in a die having an hexagonal or other non-cylindrical shaped or straight sided end, and the metal in the portion $b$ of the shaft is forced out by an hexagonal drift or other device to meet the die to correspondingly shape the extremity of the tube.

The finished shaft, as seen in Figures 1 and 2, then has a reduced portion 8 with a thickened wall which is machined to receive the bearing race or ring, an hexagonal portion 9 of uniform cross section at the extremity, and an intermediate portion 10 in the shape of a truncated cone which connects with the portion 8 and merges into the portion 9.

The spider or similar member 11, forming a part of the joint between shafts is bored out to a cone shaped opening 12 at the inner end, adapted to fit the cone portion 10 of the shaft and the outer end is broached to a shape corresponding to the shape of the portion 9 of the shaft. The hexagonal opening in the spider is indicated by the reference number 13.

The spider member is preferably secured to the shaft by means of a plug which has a conical head 14 adapted to fit within the conical portion 10 of the shaft, and an hexagonal portion 15 adapted to fit within the hexagonal portion 9 of the shaft. The plug is also provided with a threaded end 16.

In assembling, the plug is inserted through the shaft and the spider member is drawn tightly to its conical seat at 10 by means of a washer member 17 and a nut 18, the latter being locked in any preferred manner as by the cotter pin 19. It will be seen from the foregoing that the spider member is rigidly supported as against longitudinal displacement and relative rotation with respect to the shaft 7, and that the spider may be readily driven off by first removing the nut.

If desired, after the plug has been inserted and driven or drawn tightly home, it may be secured by welding.

The plug may be constructed as shown in Figures 1 and 2, that is with the portions 9 and 10 merging gently into each other, or it may be constructed as shown in Figure 5, in which case the hexagonal and conical portions join each other abruptly. Either construction will adequately serve to perform the desired function, but the latter construction is somewhat cheaper to manufacture.

It will of course be understood that the entire section of shafting need not be tubular, and that a short section 7 of tubular shafting may be employed, such section being secured, as by welding, to a solid shaft.

One of the primary advantages of my invention resides in the fact that I am enabled to use a shaft of maximum diameter and thus reduce the whipping and consequently the liability of the shaft to fail. The increase in diameter secures maximum strength with minimum metal, and owing to the large diameter I can swage down the seat portion for the bearing and have enough metal therein to permit of machining without materially weakening the shaft. In addition I am enabled to shape the extremity of the shaft for the connection with the spider without removing any metal. The connection also has much greater strength than a solid shaft containing the same amount of metal.

The advantages incident to taking a large diameter tubular shaft and swaging it down are such that the shaft itself may be used as the means for carrying the positioning nut 18. This construction is illustrated in Figure 6 from inspection of which it will be seen that the extreme end of the shaft merging with the hexagonal reduced portion 9 is cylindrical and is threaded. The thickening of the wall incident to swaging down the large diameter to the small diameter permits of the threading of the end without material weakening.

The term "non-cylindrical" as employed herein is to be broadly understood as comprehending any shape serving to prevent relative rotation between the spider and shaft.

I claim:

1. A tubular shaft section for jointed torque transmission assemblies having an end thereof swaged down to a non-cylindrical section having a relatively thicker wall to form a connecting portion for the joint, and adapted by its shape for effective anti-turning engagement in a corresponding opening, without necessity for keying.

2. A tubular shaft section for jointed torque transmission shafting having an end portion thereof swaged down to a non-cylindrical section adapted to constitute part of the joint connection, said section being connected with the rest of the section by an intermediate conical shaped portion.

3. A shaft section for jointed torque transmission assemblies having a tubular end portion swaged down to form a seat for a bearing, the extremity of the shaft being further swaged to a non-cylindrical section adapted to form part of the connection for the joint.

4. A shaft section for jointed torque transmission assemblies having a tubular end portion swaged down to form a seat for a bearing, the extremity of the shaft being further swaged to a non-cylindrical section adapted to form part of the connection for the joint, said two swaged portions being connected by an intermediate conical portion.

5. A shaft section for a jointed torque transmission assembly having a tubular end portion swaged down to form a conical seat for a joint member and a portion of uniform non-cylindrical cross section therebeyond for anti-turning engagement with such member.

6. In jointed torque transmission assemblies, the combination of a tubular metal shaft section having a reduced end, a joint member adapted to be slipped over said reduced end, a headed plug member for said reduced portion and means cooperating with the plug to position the joint member.

7. In jointed torque transmission assemblies, the combination of a tubular shaft section having a reduced end, a joint member adapted to be slipped over said reduced end, a headed plug member adapted to be inserted into said reduced portion, and means cooperating with the plug to position the joint member, said reduced portion being non-cylindrical in cross section to prevent relative rotation between the shaft and the joint member.

8. In jointed torque transmission assemblies, the combination of a tubular shaft section having a reduced end, a joint member adapted to be slipped over said reduced end, a headed plug member adapted to be inserted into said reduced portion, and means cooperating with the plug to position the joint member, said reduced portion being non-cylindrical in cross section to prevent relative rotation between the shaft and the joint member and said plug also being non-cylindrical in cross section.

9. In jointed torque transmission assemblies, the combination of a tubular shaft section having a reduced end non-cylindrical in cross section and a conical portion connecting said end with the rest of the section, a joint member adapted to be slipped over said reduced end, said joint member having an aperture conical at one end to fit said conical portion and non-cylindrical in cross section to fit said non-cylindrical end, a headed plug adapted to be inserted into the shaft, and means cooperating with the plug to position the joint member.

10. In flexible jointed torque transmission assemblies equipped with a bearing, the combination of an integral forged tubular shaft section having a portion thereof swaged down to provide a cylindrical portion of relatively thicker metal adapted to carry said bearing and a portion therebeyond for connection to the joint.

11. In jointed torque transmission assemblies, the combination of a tubular metal shaft section having a reduced end, a joint member adapted to fit said reduced end, a member extending into said reduced end and bearing on the shoulder portion formed by said reduced end, a washer member adapted to bear against the joint member, and a nut on said member adapted to engage said washer.

In testimony whereof I have hereunto signed my name.

HARRY P. MACDONALD.